J. O. KELLUM.
AUTOMATIC CAR FENDER.
APPLICATION FILED JAN. 30, 1909.
930,970.
Patented Aug. 10, 1909.
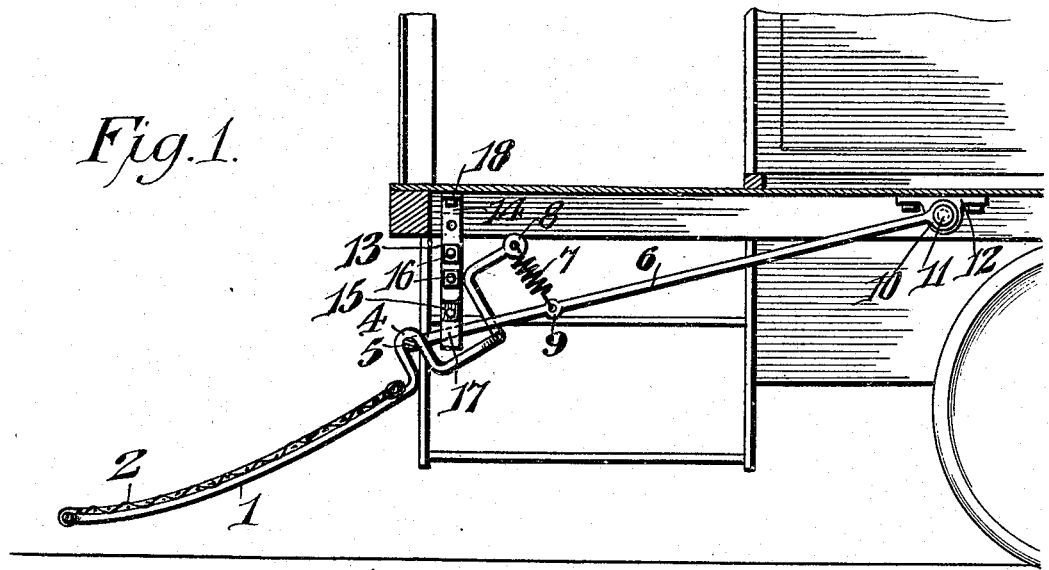
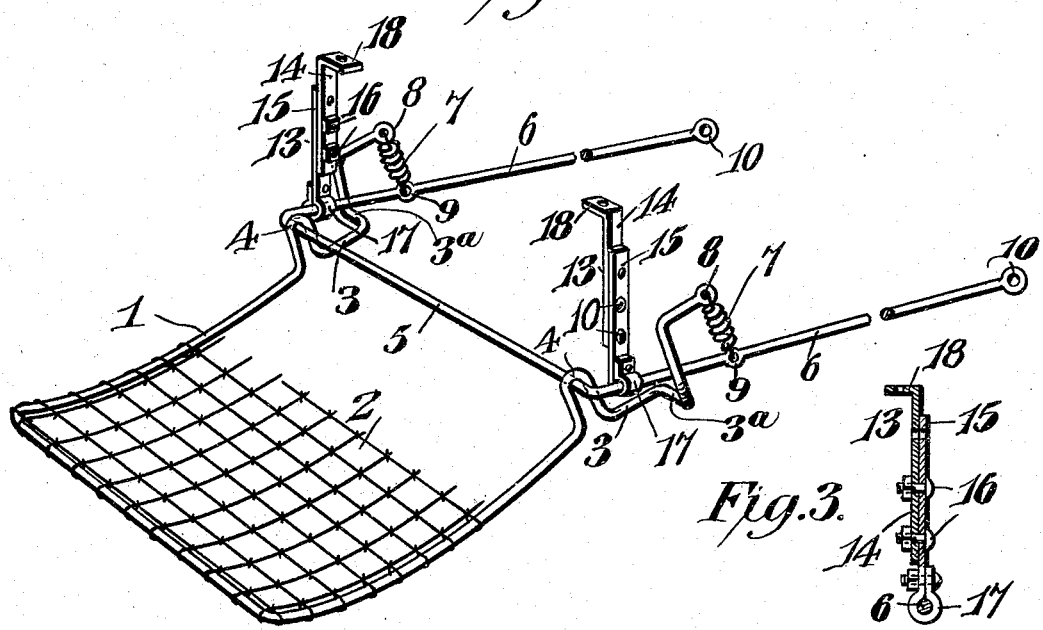
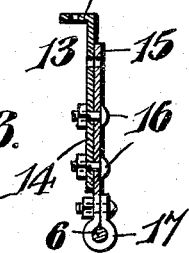
James O. Kellum, Inventor
Witnesses
By
Attorney

UNITED STATES PATENT OFFICE.

JAMES OWEN KELLUM, OF BINGHAM LAKE, MINNESOTA.

AUTOMATIC CAR-FENDER.

No. 930,970.        Specification of Letters Patent.      Patented Aug. 10, 1909.

Application filed January 30, 1909. Serial No. 475,142.

*To all whom it may concern:*

Be it known that I, JAMES O. KELLUM, a citizen of the United States, residing at Bingham Lake, in the county of Cottonwood and State of Minnesota, have invented a new and useful Automatic Car-Fender, of which the following is a specification.

The invention relates to improvements in car fenders.

The object of the present invention is to improve the construction of car fenders, and to provide a simple, inexpensive and efficient car fender of great strength and durability, adapted to be advantageously employed on the roughest roads, and capable of being automatically thrown upward when it strikes the road surface, and of being positively depressed to the rails when it comes in contact with a person or object.

A further object of the invention is to provide a car fender of this character, capable of ready adjustment to arrange its front end the desired distance above the rails, and equipped with yieldable means for normally maintaining the fender in such position.

With these and other objects in view, the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing:—Figure 1 is a longitudinal sectional view of a car fender, constructed in accordance with this invention and shown applied to one end of a car. Fig. 2 is a perspective view of the fender detached. Fig. 3 is a detail sectional view, illustrating the construction of the hangers.

Like numerals of reference designate corresponding parts in all the figures of the drawing.

1 designates a fender frame of substantially rectangular form, composed of two parallel sides and a connecting front portion. The body portion 2 of the fender may be formed of woven wires, or any other suitable material, and it is attached to the frame in the usual manner. The fender frame is normally arranged at an inclination, and its sides are extended rearwardly to form arms 3, which are provided adjacent to the rear edge of the body portion with upwardly extending approximately inverted U-shaped bends 4. The inverted U-shaped bends are hung upon a transverse pivot rod 5 of a supporting frame, composed of the said rod 5 and parallel side rods 6. The U-shaped bends 4, resting upon the transverse pivot rod of the supporting frame, form hinge connections for the fender frame and permit the same to swing upward and downward, the fender frame being normally maintained in an inclined position above the track by means of short coiled springs 7. The fender frame is of sufficient weight to cause it to drop to an inclined position, and the springs are of sufficient strength to normally maintain the front of the fender in a slightly elevated position.

The rear portions of the arms 3 are angularly bent at $3^a$ to off-set the rear terminals 8 of the said arms from the sides 6 of the supporting frame. The rear portions of the arms are preferably L-shaped, and their terminals 8 are provided with eyes in which the upper ends of the springs are secured. The lower ends of the springs are attached to eyes 9, formed in the side rods 6 and located at points intermediate of the ends thereof. The laterally off-set angularly bent arms 3 pass beneath the sides of the supporting frame and extend upward at the outer sides thereof, whereby when the fender drops, the arms 3 will be carried into engagement with the sides of the supporting frame to rigidly support the fender in such position.

The supporting frame is set at an inclination, the sides 6 being inclined. The upper or inner ends of the sides 6 are provided with eyes 10, and are pivotally secured to the bottom of the car by means of a rod 11, passing through suitable brackets 12, but any other suitable means may be employed for connecting the rear ends of the sides of the supporting rod to the car. The front or outer portions of the sides 6 are supported by hangers 13, composed of upper and lower overlapped sections 14 and 15, provided at intervals with perforations and adjustably secured together by bolts 16, passing through the perforations. The lower terminals of the lower section 15 are bent backward upon themselves and rolled to form loops or eyes 17, which receive the sides 6 of the supporting frame. The upper ends 18 of the upper sections 14 are bent at an angle and are bolted, or otherwise secured to the bottom of the car beneath the outer ends of the platform, as illustrated in Fig. 1 of the drawing. The hinge connection between the supporting frame and the bottom of the car permits the supporting frame to be swung upward or downward to raise and lower the fender, and the adjustable connection between the overlapped portions of the sections of the hanger enable the fender to be secured at the desired adjustment.

The fender is curved longitudinally to present a concave upper face in order to better retain a person or object on it. It also presents a lower convex face, and in practice the lower end of the fender will be normally arranged about two and a half inches above the track, and it will be thrown upward from the track should it come in contact with the paved surface of a street or other road bed. Should the lower end of the fender frame come in contact with a person or object, it will swing downward to the track and will be firmly held in such position by the weight of the object, so that there is no liability of a person or other object accidentally getting beneath the fender and coming in contact with the wheels of a car. Owing to the great simplicity of the fender and the few parts of which it is composed, it is not liable to get out of order.

Having thus fully described my invention, what I claim as new and desire to secure by Letters Patent, is:—

1. A fender of the class described including a supporting frame having a pivot, a fender frame having rearwardly extending arms provided with bearings receiving the pivot of the supporting frame, and yieldable means located in the rear of the bearings and connecting the arms with the supporting frame.

2. A fender of the class described including a support having a pivot, a fender frame having rearwardly extending arms provided with upwardly extending bends forming open bearings and arranged on the pivot, and yieldable means connecting the arms with the support.

3. A fender of the class described including a supporting frame composed of two sides and a connecting rod forming a pivot, a fender frame provided with rearwardly extending arms hinged to the supporting frame by the pivot thereof, said arms being extended along the sides of the supporting frame and having portions spaced therefrom, and springs connecting the arms with the sides of the frame.

4. A fender of the class described including a supporting frame composed of two sides and a transverse portion forming a pivot rod, a fender frame having rearwardly extending arms hinged to the supporting frame by the pivot rod and extending along the sides of the same, said arms being provided in rear of the pivot rod with angular portions off-setting the terminals of the arms from the sides, and springs connecting the arms with the sides of the supporting frame.

5. A fender of the class described including a supporting frame composed of two sides and a connecting transverse portion, the inner ends of the sides being provided with means for connecting them with a car, hangers connected with the outer portions of the sides of the supporting frame and provided with means for raising and lowering the latter and adapted to be secured to a car, and a fender hinged to the supporting frame by the transverse portion thereof and carried by the supporting frame when the latter is raised or lowered.

6. A fender of the class described including a supporting frame composed of two sides and a connecting portion, and a fender frame provided with rearwardly extending arms supported by the connecting portion and hinged to the frame by the said portion, said arms being extended beneath and arranged to engage the sides of the supporting frame to rigidly support the fender in an extended position.

7. A fender of the class described including a supporting frame composed of two sides and a connecting pivot rod, and a fender provided with rearwardly extending arms having bends arranged upon the pivot rod, said arms being laterally off-set in rear of the said bends and passing beneath the sides of the supporting frame and extending upward above the same and adapted to interlock therewith.

In testimony, that I claim the foregoing as my own, I have hereto affixed my signature in the presence of two witnesses.

JAMES OWEN KELLUM.

Witnesses:
SAMUEL P. HYDE,
DAVID B. WIENS.